Sept. 15, 1970          G. W. McDANIEL          3,529,300
METHOD AND APPARATUS FOR RETRIEVING INFORMATION STORED BY
  PERSISTENT INTERNAL POLARIZATION USING A PURE
              OPTICAL READ OUT TECHNIQUE
                  Filed March 12, 1968

GENE W. McDANIEL
       INVENTOR.

BY
*Joseph S. Sandrioio*

ATTORNEY.

# United States Patent Office 3,529,300
Patented Sept. 15, 1970

3,529,300
METHOD AND APPARATUS FOR RETRIEVING INFORMATION STORED BY PERSISTENT INTERNAL POLARIZATION USING A PURE OPTICAL READ OUT TECHNIQUE
Gene Warner McDaniel, Lexington, Mass., assignor to Itek Corporation, Lexington, Mass., a corporation of Delaware
Filed Mar. 12, 1968, Ser. No. 712,421
Int. Cl. G11b 7/00, 11/08; G11c 13/04
U.S. Cl. 340—173                                   20 Claims

ABSTRACT OF THE DISCLOSURE

Means are disclosed for irradiating a photoelectret, capable of having stored in it by persistent internal polarization information in the form of an image, to release free carriers trapped by persistent internal polarization in the photoelectret, for irradiating the photoelectret with infrared radiation susceptible of absorption by the free carriers, and for detecting infra-red radiation which has penetrated the photoelectret without being absorbed by the free carriers and providing a representation of the distribution of free carriers, thus the persistent internal polarization pattern which defines the image stored in the photoelectret.

CHARACTERIZATION OF INVENTION

The invention is characterized by the irradiation of a photoelectret, capable of having stored in it by persistent internal polarization information in the form of a pattern, with radiation in a first frequency range from a first radiation source to release free carriers trapped by persistent internal polarization of the photoelectret, the irradiation of the photoelectret with radiaion from a second radiation source in a second frequency range susceptible of absorption by said free carriers, and the detection, with suitable sensing means, of radiation in the second frequency range which has penetrated the photoelectret without being absorbed by the free carriers and provision of a representation of the distribution of free carriers, thus the persistent internal polarization pattern which defines the pattern stored in the photoelectret.

BACKGROUND OF INVENTION

This invention relates to methods and means for retrieving information stored by persistent internal polarization in a dielectric material.

Persistent internal polarization (PIP) is the phenomenon in which a persistent internal electric field is produced in a photoconductive dielectric material which is subjected to irradiation and an external electric field applied by suitable electrodes. The internal polarization or electric field persists in the pattern established by the incident radiation on the dielectric even after the external electric field and irradiation have been removed, and even though the electrodes are grounded, and can be deenergized by subsequent irradiation or by application of a steady state or alternating electric field.

The PIP phenomenon may be explained in terms of carrier migration in the structure of the photoconductive PIP dielectric materail; this material is also referred to as photoelectret material or simply a photoelectret. A typical photoelectret may be formed using zinc sulfide or zinc-cadmium sulfide as the host photoconductor and which may have silver or copper or other materials as impurities. Such a photoelectret would have an energy level structure including a valence band and a higher energy conduction band, and there would be a plurality of other levels, generated by the impurities or other anomolies, which are referred to as traps because they are envisioned as "trapping" migratory holes or electrons, i.e. free carriers.

Irradiating the photoelectret with sufficient energy to lift the electrons from the valence to the conduction level causes electron-hole pairs to be formed. If an external electric field is applied to the photoelectret in this condition, electrons and holes will move under the influence of the field. Some of these are caught in the impurity levels or traps and will remain trapped when the irradiation ceases, while untrapped electrons and holes, which now have reduced mobility, slowly recombine.

The trapped electrons and holes result in an electric field or polarization within the photoelectret which cannot be removed by shorting or grounding the electrodes but can be removed by irradiating the photoelectret a second time without application of an external field. The second irradiation raises the electrons and/or holes from the traps, causing them to move in the conduction and/or valence band until they recombine or reach the electrodes.

This phenomenon may be used to store information for long periods, retrieval being effected by irradiation. If the second or read-out irradiation is supplied for a short time, only a part of the PIP will be used and future read-outs may be had. Low energy radiation such as thermal or infra-red energy may be used to erase information stored on the photoelectret by supplying enough energy to the trapped carriers to raise them from the trap levels, but not enough energy to raise carriers out of the valence band.

During the application of the external electric field, the polarizing continues until the polarization voltage at the electrodes of the photoelectret equals the applied voltage. In this state there are two types of charges on the electrodes: a capacitive charge, present upon the polarizing of any dielectric; and a "bound" charge associated with the PIP field, so called because the charges are bound in their immobile condition by the PIP field. The capacitive charge is not desirable and should be removed before any read-out is undertaken to prevent confusion of it with the bound charge which provides free carriers in proportion to the PIP of the photoelectret when it is irradiated. Presently, measures of the charge produced at the electrodes when the bound charges are released upon irradiation are used to ascertain the amount of PIP of a photoelectret. If the irradiation is performed with a spot of radiation which is swept across the photoelectret in a definite pattern the charges sensed from the photoelectret may be applied to reconstruct the informaion or image stored in the photoelectret in much the same manner as with charges sensed in a vidicon or other image tube.

Since this phenomenon was first observed many attempts have been made to apply it to the broad field of information storage and retrieval and to the specific area of photography or electrophotography. One proposal involved the dusting of the polarized areas with charged carbon particles to produce a visible reproduction of the imaged information. Another proposal involved connecting the output of the PIP dielectric to modulate the intensity of the beam of a cathode ray tube in accordance with the release of the bound charges by the illumination from a second cathode ray tube which is imaged on the photoelectret and whose scanning beam is synchronized to operate with the first cathode ray tube so that a video reproduction of the PIP stored image is produced on the first cathode ray tube. "Bound" charges are those which are bound by the electric field resulting from the PIP.

These techniques met with indifferent success because of the low signal-to-noise ratio of the electrical signals produced by release of the bound charges upon the application of radiation. The low signal-to-noise ratio is due in part to the small signal voltages obtained upon release of the bound charges in comparison to the thermal or other noise originating in the photoelectret and/or amplifier so that information retrieval is incomplete and/or incorrect. The small signal voltages result because the bound charges released by irradiation immediately distribute themselves over the entire capacitance formed by the electrodes and PIP material reducing the available signal proportionally.

SUMMARY OF THE INVENTION

Thus it is desirable to have available a method and means for retrieving at a high signal-to-noise ratio information stored by persistent internal polarization in a dielectric material.

It is also desirable to provide a new method and means for retrieving information stored by persistent internal polarization in a dielectric material by sensing radiation absorption of the material during release of the bound charges.

The invention may be accomplished by irradiating a photoelectret, capable of having stored in it by persistent internal polarization information in the form of an image or pattern, with radiation in a first frequency range from a first radiation source for releasing free carriers trapped by persistent internal polarization of the photoelectret, irradiating the photoelectret with radiation from a second radiation source in a second frequency range susceptible of absorption by said free carriers, and detecting, with suitable sensing means, radiation in the second frequency range which has penetrated the photoelectret without being absorbed by the free carriers and providing a representation of the distribution of free carriers, and thus the persistent internal polarization pattern which defines the image or pattern stored in the photoelectret.

DISCLOSURE OF SPECIFIC EMBODIMENT

Other objects, features and advantages will appear from the following description of a preferred embodiment, taken together with the attached drawings, in which.

In a preferred embodiment information in the form of an image or pattern stored in a photoelectret by persistent internal polarization is recovered by scanning the surface of the photoelectret with a spot of radiation which frees the trapped carriers as it encounters them. Since the trapped carriers were trapped in a form representative of the image or pattern stored in the photoelectret, the distribution of carriers freed by the visible radiation is likewise representative of the stored image. Infra-red radiation is supplied to the areas scanned by the spot of radiation while the free carriers are still present in the pattern of the stored image and as that infra-red radiation is being swept over the photoelectret the amount of attenuation of the infra-red radiation as it is passing through the photoelectret is proportional to the amount of free carriers present in the swept portions; thus, the amount of infra-red radiation transmitted by the photoelectret is a function of the stored image or pattern. Therefore, an infra-red detector positioned to receive such transmitted infra-red radiation may be used to produce a copy of the stored image. The detecting medium may be, for example, a film medium or an infra-red electrical transducer used as input to a CRT.

Figure 1:
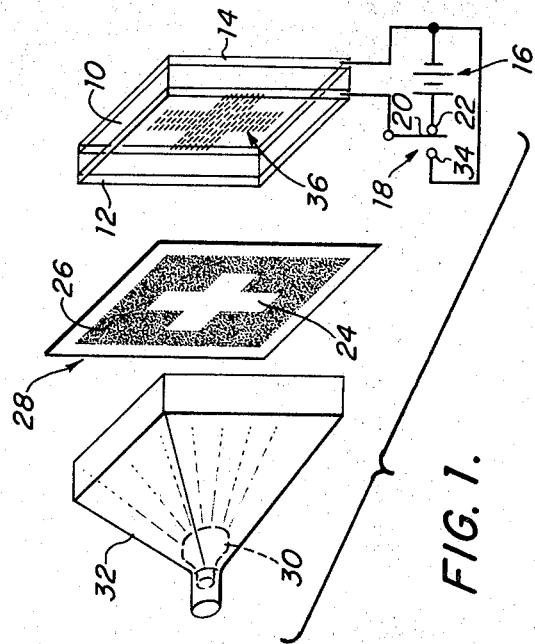
FIG. 1 is a diagrammatic view showing a cross on a transparency being stored by persistent internal polarization on a photoelectret sample.

There is shown in FIG. 1 a photoelectret 10 between transparent electrodes 12 and 14. A source of electric potential, such as battery 16, is connected between electrodes 12 and 14 when switch 18 is in the position shown, with blade 20 against contact 22. The information to be stored in a photoelectret 10 is a white cross 24 on a black background 26 contained on transparency 28. When transparency 28 is irradiated, for example by an incandescent lamp 30 in hood 32, light passes through the area of the white cross 24, but is substantially attenuated by the black background 26.

The optical image or pattern produced at photoelectret 10 contains a bright cross area and a dark background area, which results in a higher number of migratory electron-hole pairs being generated in the cross area of the optical image than in the background area. Once released, these free carriers move under the influence of the external field and contribute to the capacitive charge at electrodes 12 and 14. The electron-hole distribution in photoelectret 10 at this time is representative of the optical image incident on photoelectret 10. During this time a percentage of the electrons and holes are being continually trapped and released in energy bands between the valence and conduction bands. The distribution of the percentage of electrons and holes being trapped and released is also representative of the image or pattern incident on photoelectret 10.

When photoelectret 10 ceases to be exposed to light, generation of electron-hole pairs in it also ceases; those which are free carriers recombine and those which are trapped remain trapped, for without the light they cannot accumulate the energy required to leave the traps. With removal of the light, then, the free carriers have been "frozen" in their traps and their distribution defines an electrical pattern or image 36 of the optical pattern or image previously incident on photoelectret 10. Blade 20 may now be switched to contact 34, disconnecting battery 16 and short-circuiting electrodes 12 and 14. This switching deenergizes the external electric field on photoelectret 10 and dissipates the capacitive charge present on electrodes 12 and 14.

The photoelectret may be formed of zinc sulfide, zinc-cadmium sulfide or various other materials as the basic component, and may have silver or copper or other elements as impurities or dopants.

The radiation used to project the image on the photoelectret need not be visible light radiation, but may as well be any other form of radiant energy which promotes the generation of electron-hole pairs, e.g. X-rays, radioactive rays, ultra-violet, or infra-red. The type of radiant energy used to generate the free carriers depends in part on the basic and impurity components forming the photoelectret.

In the storage operation just described, the electrode between the exposing light and the photoelectret, electrode 12, must be sufficiently transparent to permit the radiation to pass through to the photoelectret. In the retrieval operation, to be described hereinafter, the other electrode, electrode 14, must also be sufficiently transparent. Transparent electrodes have been constructed by using a thin coating of tin oxide on glass plates and by depositing thin coatings of gold or other metals directly on the photoelectret. Photoelectrets having thicknesses from $10^{-3}$ to $10^{-5}$ inches have been used. The electrical image or pattern which is "frozen" in the photoelectret by PIP upon removal of the radiant energy may be stored in the photoelectret for extended periods. Images or patterns so stored have been retrieved after periods on the order of hundreds of hours, and in some cases after even longer periods. Preferably, the capacitive charge on the electrodes is dissipated prior to storage, but may be maintained until it is desired to retrieve the stored information.

Figure 2:
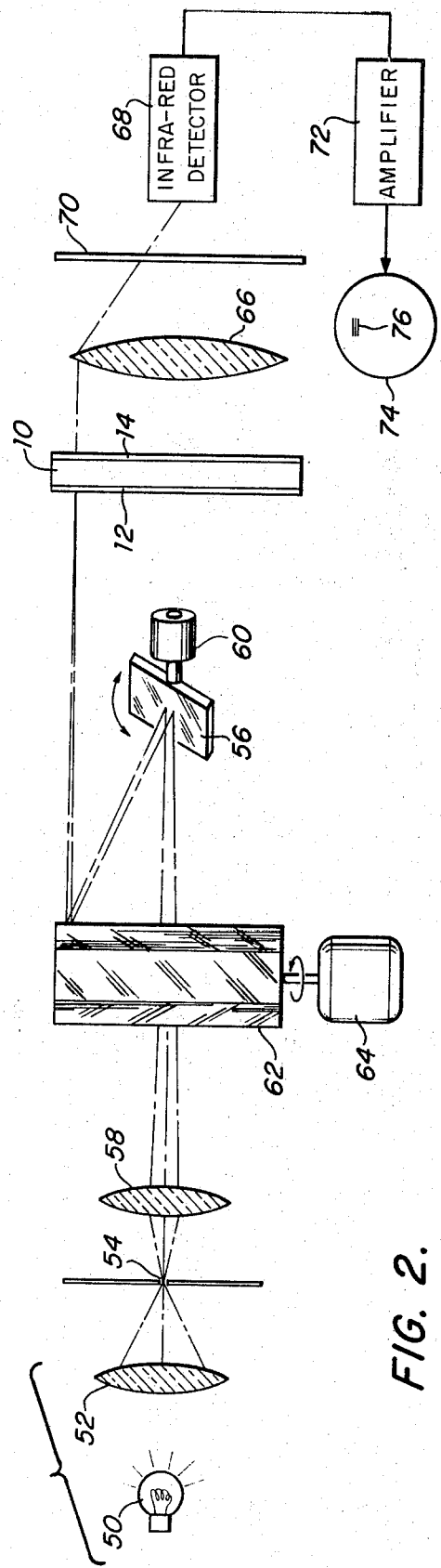
FIG. 2 is a diagrammatic view of apparatus for retrieving, according to this invention, information in the form of an image or pattern stored in a photoelectret sample.

Photoelectret 10, with the information (the cross) stored in it in the form of an electrical image or pattern by means of PIP, is shown in FIG. 2 installed in apparatus for retrieving the information according to the invention.

The invention utilizes the presence of free carriers within the photoelectret, rather than the flow of free carriers through the photoelectret in an electric circuit, to read out the PIP distribution. More specifically, the invention uses the absorption characteristics of the free carriers in a photoelectret instead of utilizing current flow resulting from the free carriers to measure PIP. In this manner the reduction in signal due to the large capacitance of the photoelectret is completely avoided.

The photoelectret must be exposed to radiation of a proper wavelength to release the trapped carriers, and be exposed to radiation of a wavelength which will be absorbed by those released free carriers. The strength and position of the latter radiation penetrating the photoelectret define a negative image or pattern of the electrical image or pattern stored.

In FIG. 2 radiation in the range of visible light provided by an incandescent lamp 50 is used to release the trapped carriers in the photoelectret, and infra-red radiation, also provided by lamp 50, is used as the radiation susceptible of absorption by free carriers.

The radiation from lamp 50 is focused on pinhole 54 by lens 52 and is then focusd to a spot on the photoelectret 10 by lens 58. Mirrors 56 and 62 are interposed between lens 58 and photoelectret 10. Drive motor 60 tilts mirror 56 between an upwardly-directed reflecting posture and a downwardly-directed reflecting posture to impart a vertical motion or sweep to the radiation. In addition, mirror 56 is disposed at an angle to the direction of radiation from lens 58 so that the rediation is reflected to rotating mirror 62 driven by motor 64.

Rotating mirror 62 causes the spot of radiation reflected to it from mirror 56 to be swept horizontally across photoelectret 10. With the spot of radiation thus capable of moving in two transverse directions relative to photoelectret 10, an area scan of the photoelectret can be accomplished. By rotating mirror 62 at high speeds relative to the rocking of mirror 56, the spot of radiation may be driven horizontally across photoelectret 10 many times each time the spot of radiation from mirror 56 is driven once vertically across rotating mirror 62. In this manner an area scan in the nature of a television raster may be effected.

As the spot of radiation sweeps across photoelectret 10 the visible light radiation releases free carriers whenever trapped carriers are encountered. Infra-red radiation also contained in the spot is absorbed by free carriers released by the visible light radiation. In areas where trapped carriers are at a minimum, few free carriers are released by the visible light radiation, and in those areas infra-red radiation penetrates the photoelectret more strongly.

Radiation passing through photoelectret 10 is collected by lens 66 and focused on infra-red detector 68 through an infra-red filter 70. The output of detector 68 is amplified by amplifier 72 and applied to cathode ray tube (CRT) 74 to vary the intensity of its electron beam which is driven in synchronism with the movement of mirrors 56 and 62 to provide a raster similar to the area scan generated by the spot of radiant energy impinging on photoelectret 10. The picture being constructed on the face of CRT 74 is a negative of the original white cross 24 as is apparent from the black section 76 of the cross beginning to take shape on CRT 74.

The reproduction at CRT 74 of the original may be inverted to provide a positive image of the original instead of a negative one, by electrically inverting the signal submitted to CRT 74.

The image or pattern reproduced from photoelectret 10 may be optically inverted to provide a positive reproduction of the original image by first exposing the entire photoelectret to visible radiation with an external field applied, then removing the external field and visible radiation leaving a uniform PIP in the photoelectret. After dissipating the capacitive charge on the electrodes, visible radiation may again be applied to the photoelectret through some information-bearing transparency or mask. The visible radiation passing through the less dense areas of the transparency substantially dissipates the PIP of corresponding areas on the photoelectret by releasing the trapped carriers. The more dense areas of the transparency prevent visible radiation from reaching the photoelectret and thus prevent release of trapped carriers in those areas so that those areas retain their polarization. Read-out in the manner previously described will result in the infra-red radiation being more absorbed in the areas of the photoelectret corresponding to the more dense areas of the transparency. As a result the image or pattern produced is a positive.

The image or pattern produced by the infra-red absorption technique is not restricted to being sensed by an infra-red detector having an electrical output. Nor is it restricted to a particular scanning pattern or read-out procedure. For example, an infra-red sensitive film may be substituted for detector 68 and the photoelectret may be exposed in its entirety to visible and infra-red radiation, as by an area of light such as produced by lamp 30 and hood 32, FIG. 1, so that the image read out of the photoelectret produces an image on that film.

In the storage and retrieval operations disclosed in the specific embodiment using a zinc sulfide photoelectret with copper or silver impurities, the generation of free carriers and the release of trapped carriers are performed by visible light radiation, and infra-red radiation is used to exploit the absorption characteristic of the free carriers, but this is only one example of the types of radiation that may be used. The wavelength or frequency of the radiation, or the ranges of wavelengths or frequencies, i.e. infra-red, visible, ultra-violet, X-ray, radioactive, are dependent in part on the structure and sensitivity of the particular photoelectret.

In polarizing a photoelectret there are four major steps, not necessarily in this order: apply the external electric field; remove the external electric field; apply the free carrier generating radiation; remove the free carrier generating radiation. Various permutations of these steps are workable alternatives. Applying the radiation and field together, then removing the radiation, then removing the field, has given good results. But other sequences will suffice so long as there are sufficient free carriers available to be trapped while an electric field is present to cause the migration of the free carriers.

Similarly, in depolarizing or reading out the photoelectret, many different sequences may be workable but the radiation used to exploit the absorption characteristic of the photoelectret must be applied while there are present free carriers released by the radiation used to raise the carriers out of their traps Other embodiments will occur to those skilled in the art and are within the following claims:

What is claimed is:

1. Apparatus for retrieving information in the form of a pattern stored in a photoelectret by persistent internal polarization comprising:
   a first radiation source for irradiating said photoelectret with radiation in a first frequency range to release free carriers trapped by persistent internal polarization of said photoelectret;
   a second radiation source for irradiating said photoelectret with radiation in a second frequency range susceptible of absorption by said free carriers; and
   a detector for detecting radiation in said second frequency range which has penetrated said photoelectret without being absorbed by said free carriers and providing a representation of the distribution of free carriers, thus the persistent internal polarization distribution which defines the pattern stored in said photoelectret.

2. The apparatus of claim 1 in which said detector includes a transducer for providing said representation in the form of an electrical signal.

3. The apparatus of claim 1 in which said detector includes a photosensitive medium for providing a reproduction of the pattern stored in said photoelectret.

4. The apparatus of claim 1 in which said first source provides electromagnetic radiation in the visible radiation frequency range.

5. The apparatus of claim 4 in which said second source provides electromagnetic radiation in the infra-red frequency range.

6. The apparatus of claim 1 further including means for focusing radiation from said first and said second sources to a spot at said photoelectret.

7. The apparatus of claim 6 further including drive means for providing relative motion between said spot and said photoelectret to sweep said spot over successive portions of said photoelectret.

8. The apparatus of claim 7 in which said drive means includes means for providing relative motion between said photoelectret and said spot in two directions transverse to each other to provide an area scan of said photoelectret.

9. The apparatus of claim 6 in which the radiation from each of said sources is distributed over the entire area of said spot.

10. The apparatus of claim 6 in which the radiation from each of said sources forms a separate portion of said spot.

11. A method of retrieving information in the form of a pattern stored by persistent internal polarization in a photoelectret comprising:
   irradiating said photoelectret with radiation in a first frequency range to release free carriers trapped by persistent internal polarization of said photoelectret;
   irradiating said photoelectret with radiation in a second frequency range susceptible of absorption by said free carriers; and
   detecting radiation in said second frequency range which has penetrated said photoelectret without being absorbed by said free carriers and providing a representation of the distribution of free carriers, thus the persistent internal polarization distribution which defines the pattern stored in said photoelectret.

12. The method of claim 11 in which the detection of the radiation in the second frequency range is accomplished with a transducer for providing the representation in the form of an electrical signal.

13. The method of claim 11 in which the detection of the radiation in the second frequency range is accomplished with a photosensitive medium for providing a reproduction of the pattern stored in the photoelectret.

14. The method of claim 11 in which said first frequency range includes visible radiation.

15. The method of claim 11 in which said second frequency range includes infra-red radiation.

16. The method of claim 11 further comprising focusing the radiation in said first and second frequency ranges to a spot at said photoelectret.

17. The method of claim 16 further comprising providing relative motion between said photoelectret and said spot to sweep the spot over successive portions of said photoelectret.

18. The method of claim 17 in which relative motion between said photoelectret and said spot is provided in two transverse directions to provide an area scan of said photoelectret.

19. The method of claim 16 in which the radiation in each of said first and second frequency ranges is distributed over the entire area of said spot.

20. The method of claim 16 in which the radiation in each of said first and second frequency ranges forms a separate portion of said spot.

References Cited

UNITED STATES PATENTS

| | | | |
|---|---|---|---|
| 3,199,086 | 8/1965 | Kallman | 340—173 |
| 3,315,563 | 4/1967 | Harper | 350—285 |

TERRELL W. FEARS, Primary Examiner

H. L. BERNSTEIN, Assistant Examiner

U.S. Cl. X.R.

250—219; 350—160